May 27, 1947. M. RONNING 2,421,037
CROP CONVEYOR MECHANISM
Filed May 21, 1945 2 Sheets-Sheet 1
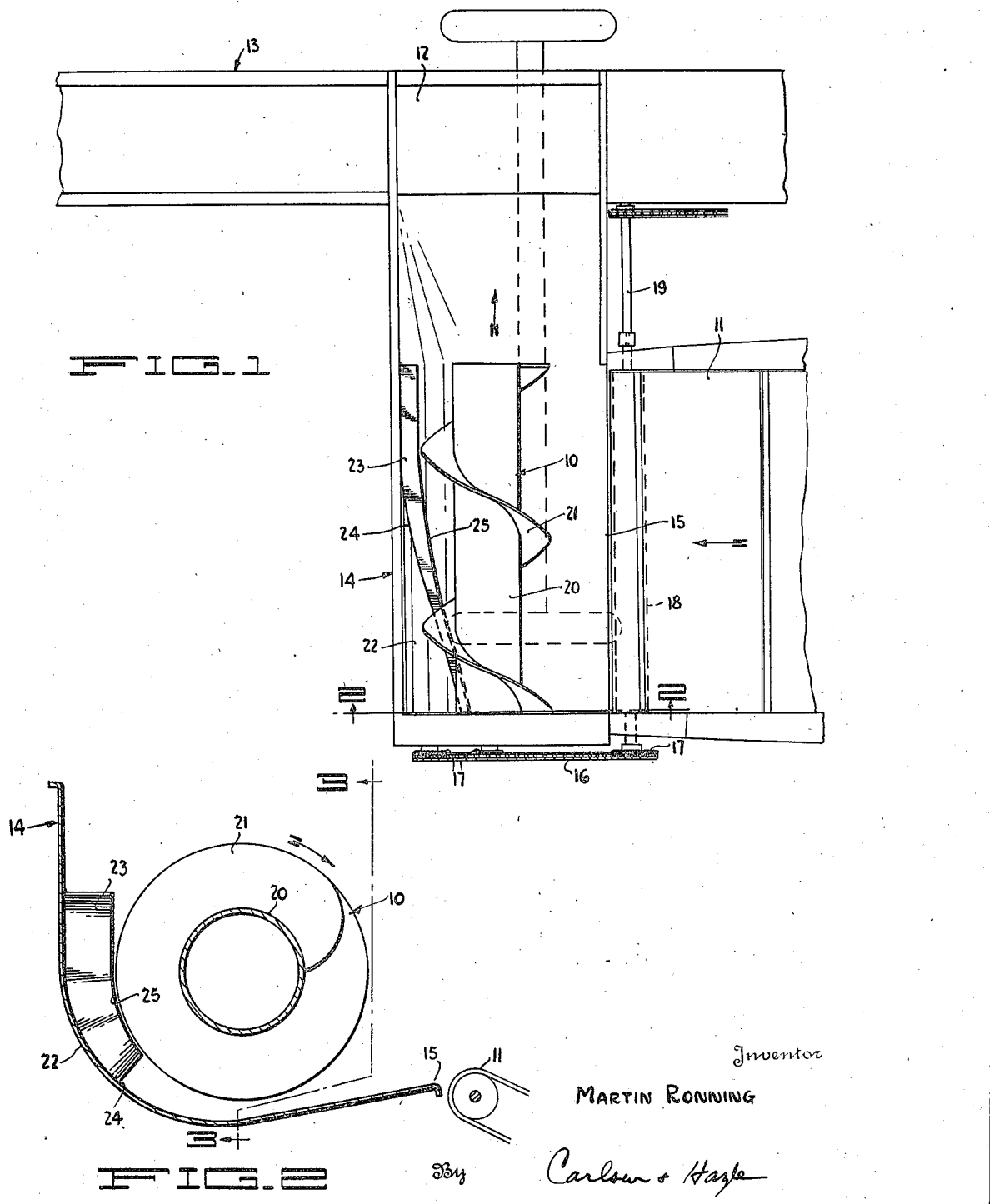
Inventor
MARTIN RONNING
By Carlsen & Hazle
Attorneys May 27, 1947.                M. RONNING                 2,421,037
                       CROP CONVEYOR MECHANISM
                         Filed May 21, 1945           2 Sheets-Sheet 2

Inventor

MARTIN RONNING

By Carlsen & Hazle

Attorneys

Patented May 27, 1947

2,421,037

UNITED STATES PATENT OFFICE 2,421,037

CROP CONVEYOR MECHANISM

Martin Ronning, St. Louis Park, Minn., assignor to Minneapolis-Moline Power Implement Company, Minneapolis, Minn., a corporation of Delaware Application May 21, 1945, Serial No. 595,036

10 Claims. (Cl. 198—213)

This invention relates to improvements in conveyors used for moving cut grain or hay crops and other material characterized by its elongated stringy, stalky or fibrous nature.

It is a common practice to provide such machines as combines and hay balers for example with one or more feed augers of the type which is supported at one end and open at the other, to which the cut crop is delivered along one side and by which the crop is conveyed endwise along the auger to threshing, baling or other working parts. The crop is delivered to the auger along the forward side thereof and is picked up by the helical vane or flight thereof and moved lengthwise with respect to the axis of the auger until finally delivered from one end thereof. It is found that the material has a pronounced tendency, however, to wrap about the auger and greatly impede its operation. In the effort to overcome this tendency of the material to rotate with the auger flights, or to wrap around the auger, baffle or stripper plates are used and for an example of one of such arrangements attention is called to my patent for Combine, No. 1,959,689, issued May 22, 1934. As shown therein a plate is arranged alongside the auger, adjacent its delivery end where the quantity of grain being handled is naturally greatest. This plate engages the grain so that it is held against following the auger flight as it revolves and for relatively light and dry crop materials is found to be satisfactory in function.

However, I have found that in certain conditions and particularly when conveying hay and heavy materials of any kind, that the straight stripper plate, or one running parallel with the auger axis, is not effective to prevent wrapping or winding of the material. This results from the fact that the edge of the flight crosses the stripper plate at an acute angle which is determined by the angle of the helix on which the flight is formed. The material is thus wedged into this relatively sharp angle instead of traveled along the stripper plate and the frictional drag of the flight on the material then pulls it along causing it to rotate with the auger.

I have discovered that a stripper plate may be positioned at an angle to the axis of the conveyor so that the edge of the flight will cross the edge of the plate at approximately right angles and so that the material will not be crowded or wedged into the angle but will be caused to travel lengthwise along the plate as the auger rotates. The travel of the material is materially assisted also by the angle at which the plate is positioned.

It is accordingly the primary object of my invention to improve auger conveyor structures of this nature and in this manner, by angling the stripper plate with respect to the auger axis or otherwise so shaping and arranging the plate that the edges of the auger flight will cross the plate at an angle different from and more effective than that resulting when the plate is substantially parallel with the axis. Another object is to arrange and shape the stripper plate to secure the maximum advantage in operation and in furtherance of this object I may shape the plate on a spiral or curve best suited to the pitch of the auger flight to secure my desired results.

These and other more detailed and specific objects will be disclosed in the course of the following specification, reference being had to the accompanying drawings, in which—

Fig. 1 is a fragmentary plan view of a hay baler including a feed auger in connection with which a stripper plate of my improved form is shown in use.

Fig. 2 is an enlarged vertical, longitudinal sectional view along the line 2—2 in Fig. 1.

Figure 3:
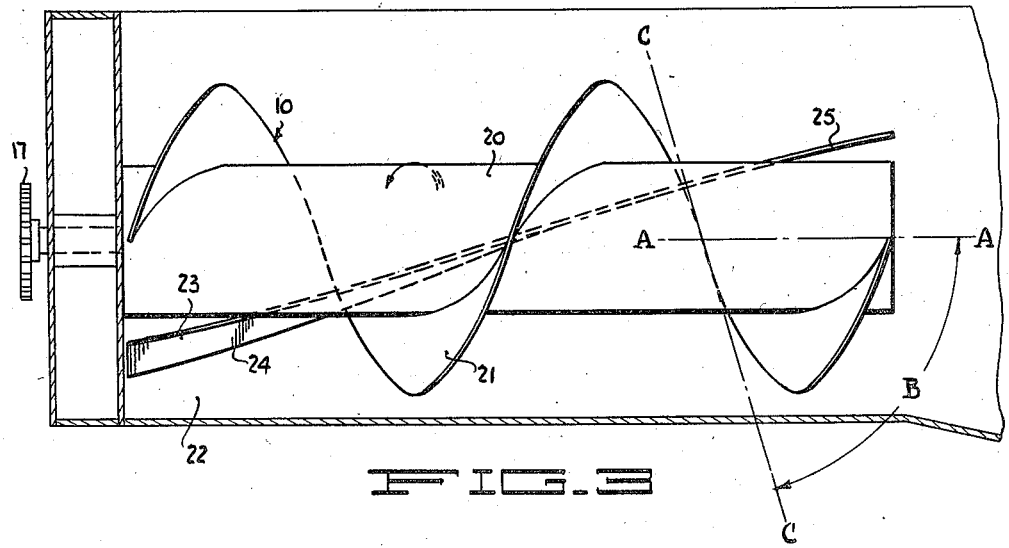
Fig. 3 is a vertical transverse sectional view substantially along the line 3—3 in Fig. 2.

Referring now more particularly and by reference characters to the drawing I show therein an open-ended feed auger 10 for conveying hay from a rearwardly moving raddle conveyor 11 toward a feed opening 12 into a baling frame and chamber, designated generally at 13, wherein the hay is pressed into bales. The auger is positioned transversely with respect to the direction of travel of the machine in a trough-like auger or conveyor housing 14 which is open across its forward side 15 to receive the hay carried rearwardly by conveyor 11. The conveyor 11 receives the hay at its lower forward edge from a pick-up mechanism (not shown) which picks up and delivers hay from the windrow as the machine advances over the field. The auger 10 is rotated in any suitable manner, as by a chain 16 running over three sprockets indicated throughout at 17, and the power may be taken from the upper roller 18 of conveyor 11 which in turn is driven by a shaft 19 leading inwardly to the baler mechanism. The arrangement is such that the auger 10 is rotated about a transverse horizontal axis and the auger has a center shaft in the form of a tube 20 about which is disposed a spiral or helical flight or vane 21, the twist of which is such that the auger will move the material received at its forward side inwardly, or upwardly as viewed in Fig. 1, toward feed opening 12.

The foregoing arrangement of the various parts is essentially the same as that shown in the co-pending application of Kenneth M. Kieth and Martin Ronning, Serial No. 530,796, for Baler, filed April 13, 1944. This disclosure is chosen for exemplification only, however, and it is to be understood that I may apply my present invention to other feed augers as used in combines or similar equipment wherein the auger handles crop-like materials of stalky or stringy nature.

As heretofore stated it has been found that the material has a tendency to wrap around the auger in operation. To counteract this, stripper plates are conventionally placed along the upwardly curving and extending back wall 22 of the housing, but all such plates heretofore to my knowledge have been arranged parallel with the axis of the auger with the results previously pointed out herein.

Figure 4:
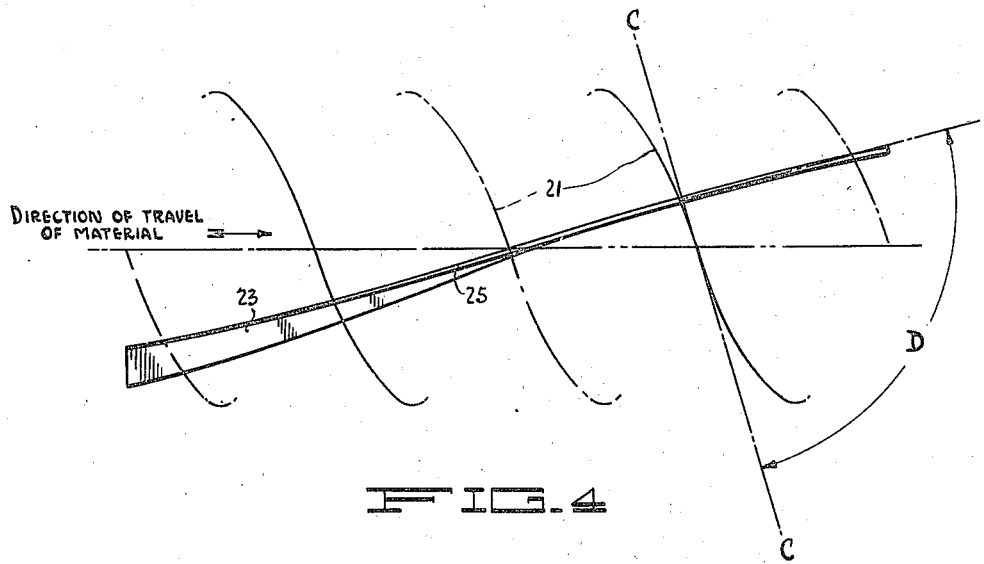
Fig. 4 is a diagrammatical view illustrating the angle at which the flight edge crosses the plate in various positions during the rotation of the flight.

Referring particularly now to Figs. 3 and 4 I provide as there shown and in accordance with my present invention a stripper plate or baffle 23 which is of a novel shape and position as will now be described. Attention is first called to the direction of rotation of the auger 10 and the direction in which the material is moved by such rotation as indicated in the drawing. As will be clearly evident the flight 21 moves upwardly at the rear side of the auger as the material is conveyed and thus crosses a horizontal plane indicated by line A—A (Fig. 3), coincident with the axis of rotation, at an angle B which is 90°, less the angle indicated by line C—C of the helix upon which the flight 21 is formed. This angle, which is the same as formed by the ordinary straight stripper plate (not here shown) placed parallel with the axis of the auger, is acute and it is evident that the material moved upwardly at the rear of the auger against such a plate may be forced into this sharp angle and wedged so that it fails to travel lengthwise, but instead is dragged around the auger by the friction of the flights. There thus results the undesirable wrapping or winding of the material as previously described.

To prevent this I dispose my stripper plate 23, which is of elongated narrow form and welded or otherwise suitably secured by one edge 24 to the inside of housing 14, at an angle with respect to the axis of the auger such that it traverses the edge of the flight 21 at an angle D (Fig. 4) with respect to the helix angle C—C which is substantially greater than angle B aforesaid. That is, the peripheral edge of the flight 21 throughout its length crosses the free edge 25 of the plate 23 at approximately a right angle or one greater than an acute angle. Thus the material is less likely to be wedged into this larger and wider angle and the endwise travel of the material along the stripper plate 23 toward the delivery end of the auger is further facilitated by the fact that the plate angles upwardly in the direction of travel of the material and in the direction in which the material is forced by the upwardly moving flight at the rear of the auger.

The flight 21, of course, slightly clears the edge of the stripper plate, as clearly shown.

The stripper plate 23 extends from a point slightly to the rear of the underside of the auger at its outer or "receiving" end and angles and curves upwardly to terminate slightly above the axis of the auger at its inner or delivery end. To better fit the curved bottom and rear inner surfaces of the housing 14 and correspond to the edge curvature of the flight 21 the stripper plate 23 is formed on a spiral opposite to the angle of the spiral of the flight and, of course, only through a partial turn. Since only the rear part of the auger, or the part opposite the side along which the material enters, may thus be embraced or fitted with the stripper plate in order not to interfere with feeding or delivery, it follows that the plate is particularly applicable to augers of short length and large diameter. However, through reducing the angle D, by reducing the inclination of the plate with respect to plane A—A, it may be applied to a longer auger and still retain much of its effectiveness.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A crop conveyor comprising a housing, a rotary auger in the housing having a helical vane and adapted to receive crop material along one side and move the material lengthwise of the auger, and a helical stripper plate extending generally lengthwise of and substantially co-extensive with the auger, and positioned on the side thereof opposite to that at which the material is received, the said stripper plate being twisted in a direction opposite to that of the auger vane and having one edge disposed substantially throughout its length an equal distance from the outer edge of the auger vane, whereby the stripper plate will cross the flights of the auger vane at substantially right angles thereto.

2. A crop conveyor comprising a housing, a rotary auger in the housing having a helical vane and adapted to receive crop material along one side and move the material endwise, and a substantially helical stripper plate extending coextensively in length with the auger and positioned on the side thereof opposite to that at which the material is received, the said stripper plate being angularly positioned with respect to the axis of the auger and being disposed substantially throughout its length an equal distance from the axis of the auger whereby each flight of the auger vane will cross the plate at approximately a right angle.

3. In a crop conveyor of the character described, including a trough, a horizontally disposed rotary auger in the trough and having a screw acting vane for engaging and moving material lengthwise in the trough, a stripper plate attached to the trough and extending edgewise toward the auger into close proximity with successive flights of the auger vane, said stripper plate being acutely angled from one end to the other with respect to the horizontal plane of the auger axis.

4. The combination with a horizontally arranged trough and a crop feed auger therein for receiving crop material along its downwardly moving side and operative to move the material endwise from one end to the other of the trough, of a stripper plate attached to the trough and extending from a point substantially below a horizontal plane through the auger axis at the first mentioned end of the auger and thence upwardly and along the upwardly moving side of the auger to a point above the said plane, said stripper plate having a curved edge in close proximity to successive auger flights.

5. The combination with a trough and a horizontally arranged crop feed auger therein for receiving crop material along its downwardly moving side and operative to move the material from one end to the other in the trough, of a generally helical stripper plate extending from a point substantially below the axis level of the first mentioned end of the auger and thence upwardly around and along the upwardly moving side thereof to a point above the axis level of the auger at its said other end.

6. In a conveyor mechanism of the character described, a housing having an upwardly curving wall, a feed auger arranged in said housing along and in spaced relation to said wall for feeding crop material endwise therealong, and a stripper plate secured along its rear edge to said wall of the housing along the rear of the auger and positioned to be engaged by crop material to prevent it from rotating with the auger, the said stripper plate being helically curved in a direction reverse to that of the auger vane and extending with one end substantially below the axis level of the auger.

7. In a conveyor mechanism including a housing bottom and back wall forming a longitudinal trough, an auger operating in the trough and having a forwardly exposed longitudinal section for receiving material moving rearwardly into the trough, a baffle secured to the back wall and being of a length coextensive with said longitudinal section of the auger, said baffle being helically curved throughout its length in a direction opposite to that of the auger vane whereby the baffle will cross the flights of the auger vane substantially at right angles thereto.

8. In a conveyor mechanism including a housing bottom and back wall forming a longitudinal trough, an auger operating in the trough and having a forwardly exposed longitudinal section for receiving material moving rearwardly into the trough, a baffle plate secured along its rear edge to the back wall and with its forward edge following a generally helical curve adjacent the rear of the auger, said baffle being substantially coextensive in length with the exposed longitudinal section of the auger.

9. In a conveyor mechanism a trough forming housing having an end wall, an auger disposed in the trough and supported at one end entirely from the end wall with its other or delivery end open, a baffle plate extending between the auger and housing and secured along its outer edge to the housing, the inner edge of the plate adjacent the auger being helically curved so as to cross the auger flights substantially at right angles thereto.

10. In a conveyor mechanism a trough forming housing having an end wall, an auger disposed in the trough and supported at one end entirely from the end wall with its other or delivery end open, a baffle plate extending between the auger and housing and secured along its outer edge to the housing, said baffle plate extending in a generally helical curve from said housing end wall to a point adjacent the open end of the auger.

MARTIN RONNING.

REFERENCES CITED

The following references are of record in the file of this patent:

UNITED STATES PATENTS

| Number | Name | Date |
| --- | --- | --- |
| 1,972,031 | Pierson | Aug. 28, 1934 |
| 2,270,471 | Pilcher et al. | Jan. 20, 1942 |
| 2,377,805 | Oehler | June 5, 1945 |
| 2,122,673 | Sheets | July 5, 1938 |
| 1,959,689 | Ronning | May 22, 1934 |
| 1,967,693 | Webb | July 24, 1934 |
| 2,033,890 | Mittendorf | Mar. 10, 1936 |